(12) United States Patent
Lasser

(10) Patent No.: US 7,426,623 B2
(45) Date of Patent: Sep. 16, 2008

(54) SYSTEM AND METHOD FOR CONFIGURING FLASH MEMORY PARTITIONS AS SUPER-UNITS

(75) Inventor: Menahem Lasser, Kohav-Yair (IL)

(73) Assignee: SanDisk IL Ltd, Kfar Saba (IL)

( * ) Notice: Subject to any disclaimer, the term of this patent is extended or adjusted under 35 U.S.C. 154(b) by 217 days.

(21) Appl. No.: 11/113,148

(22) Filed: Apr. 25, 2005

(65) Prior Publication Data

US 2006/0161726 A1 Jul. 20, 2006

Related U.S. Application Data

(60) Provisional application No. 60/643,735, filed on Jan. 14, 2005.

(51) Int. Cl.
*G06F 12/02* (2006.01)

(52) U.S. Cl. .................. 711/170; 711/103; 711/173

(58) Field of Classification Search ................. 711/103, 711/173
See application file for complete search history.

(56) References Cited

U.S. PATENT DOCUMENTS

| 5,404,485 | A | 4/1995 | Ban |
| 5,937,425 | A | 8/1999 | Ban |
| 6,034,897 | A * | 3/2000 | Estakhri et al. ........ 365/185.33 |
| 6,081,878 | A * | 6/2000 | Estakhri et al. ............. 711/168 |
| 6,134,151 | A | 10/2000 | Estakhri et al. |
| 6,292,918 | B1 | 9/2001 | Sindhushayana et al. |
| 6,591,330 | B2 | 7/2003 | Lasser |
| 6,678,785 | B2 | 1/2004 | Lasser |
| 6,906,961 | B2 * | 6/2005 | Eggleston et al. ...... 365/185.29 |

* cited by examiner

*Primary Examiner*—B. James Peikari
(74) *Attorney, Agent, or Firm*—Mark M. Friedman

(57) ABSTRACT

A flash memory system including one or more flash memory devices; the flash memory devices are partitioned into multiple units, at least a first unit and a second unit. A mechanism which allocates the units in combination as a super-unit, reserves at least a portion of a first unit field required for managing the super-unit in the first unit and the mechanism reserves at least a portion of a second unit field required for managing the super-unit in the second unit. Preferably, the first unit field and the second unit field are different unit fields, or the first unit field and the second unit field are the same unit field. Preferably, the flash memory device each support at least two planes, and the first unit and the second unit each belong to a different plane. Alternatively, there are two flash memory devices, and the first unit and the second unit each belong to a different flash memory device.

10 Claims, 3 Drawing Sheets

20 Extra area

31 Extra area (non-first unit of super unit)

40 Extra area of 12 bytes (first unit of super unit)

51
Extra area of 12 bytes

60
Extra area (first unit of super unit)

71
Extra area (second unit of super unit)

SYSTEM AND METHOD FOR CONFIGURING FLASH MEMORY PARTITIONS AS SUPER-UNITS

CROSS REFERENCE TO RELATED APPLICATIONS

This application claims the benefit from US provisional application 60/643,735 filed Jan. 14, 2005 by the present inventor.

FIELD AND BACKGROUND OF THE INVENTION

The present invention relates to an improved system for managing flash memories and, more particularly, for improving the performance of flash devices in which two or more units of the memory are allocated as super-units.

Flash devices include electrically erasable and programmable read-only memories (EEPROMs) made of flash-type, floating-gate transistors and are non-volatile memories similar in function and performance to EPROM memories, with an additional function that allows an in-circuit, programmable operation to erase portions of the memory. Flash devices have the advantage of being relatively inexpensive and requiring relatively little power as compared to traditional magnetic storage disks. However, flash devices have certain limitations that make using them at the physical address level a bit of a problem. In a flash device, it is not practical to rewrite a previously written area of the memory without a prior erase of the area, i.e. flash cells must be erased (e.g programmed to "one") before they can be programmed again. Erasing can only be done for relatively large groups of cells usually called "erase blocks" (typically of size 16 to 128 Kbytes in current commercial NAND devices, and of larger size in NOR devices). Therefore updating the contents of a single byte or even of a chunk of 1 kilobytes requires "housekeeping" operations—parts of the erase block that are not updated must first be moved elsewhere so they will be preserved during erasing, and then moved back into place.

Furthermore, some of the blocks of the device are "bad blocks", which are not reliable and their use should be avoided. Blocks are declared as "bad blocks" either by the manufacturer when initially testing the device, or by application software when detecting the failure of the blocks during use of the device in the field.

To overcome these limitations of the background art, a Flash File System (FFS) was disclosed in U.S. Pat. No. 5,404,485, which is assigned to the assignee of the present application and is hereby incorporated by reference as if fully set forth herein. FFS provides a system of data storage and manipulation on flash devices which allows these devices to emulate magnetic disks. In the existing art, applications or operating systems interact with the flash storage subsystem not using physical addresses but rather virtual addresses. There is an intermediary layer between the software application and the physical device that provides a mapping from the virtual addresses into the physical addresses. While the software may view the storage system as having a contiguous defect-free medium that can be read or written randomly with no limitations, the physical addressing scheme has "holes" in its address range (due to the bad blocks, for example), and pieces of data that are adjacent to each other in the virtual address range might be greatly separated in the physical address range. The intermediary layer that does the mapping described above may be a software driver running on the same CPU on which the applications run. Alternatively, the intermediary layer may be embedded within a controller that controls the flash device and serves as the interface point for the main CPU of the host computer when the host computer accesses the storage. This is for example the situation in removable memory cards such as secure digital (SD) cards or multimedia cards (MMC), where the card has an on-board controller running a firmware program that among other functions, implements the type of mapping described above.

Software or firmware implementations doing such address mappings are typically called "flash management systems" or "flash file systems". The latter term is a misnomer, as the implementations do not necessarily support "files", in the sense that files are used in operating systems or personal computers, but rather support block device interfaces similar to those exported by hard disk software drivers. Still, the term is commonly used, and "flash file system" and "flash management system" are used herein interchangeably.

Other prior art systems that implement virtual-to-physical address mapping can be found in U.S. Pat. No. 5,937,425 disclosed by Ban and U.S. Pat. No. 6,591,330 disclosed by Lasser, both of which are incorporated by reference for all purposes as if fully set forth herein.

In U.S. Pat. No. 5,937,425, which is particularly suitable for NAND-type flash devices, the mapping is done as follows, referring to FIG 1*a* (prior art). Physical address space 13 is composed of physical units 111 that are actually the erase blocks i.e. the smallest chunks that can be erased. Each physical unit 111 contains one or more physical pages 113, where a page is the smallest chunk that can be written. A virtual address space 11 is composed of virtual units 121 that have the same size as the physical units. Each virtual unit contains one or more virtual pages 123, having the same size as physical pages 113. When a virtual address is provided by an application, for reading or writing, the virtual unit number to which that address belongs is extracted from the virtual address. There is a mapping that assigns to each virtual unit 121 either one physical unit 111 or a chain of more than one physical unit 111. Then physical page 113 corresponding to requested virtual page 123 within virtual unit 121 is located within the corresponding physical unit(s) 111, using a "local" mapping rule that relates virtual pages 123 to physical pages 113, or using control information stored with physical pages 113.

One of the advantages of the methods disclosed in U.S. Pat. No. 5,937,425 is that as the main mapping is done over units rather than pages, the translation tables become much smaller, as there are much fewer units than pages. Another advantage is write performance improvement that results from being able to assign more than one physical unit 111 to one virtual unit 121.

In order for a flash management system to implement the mapping of virtual to physical addresses, it is necessary to associate and store some control information (also called "overhead data" or "metadata") with the pages and units of the storage system. Even if the flash management system performs its address mappings using translation tables fully kept in RAM, it would still need to store some control information in non-volatile storage, as otherwise the flash management system cannot create and initialize its tables when starting up again after a power-down. Therefore all flash management systems write some control fields into the flash memory in addition to the user data stored within the system.

Because of this, all NAND flash devices are manufactured in advance with extra bytes of storage attached to each page. Typically the amount of extra space provided is 16 bytes per 512 bytes of user data space. This "extra area" (or "spare area") forms an integral part of the page and both the extra area and user data can be written together in a single write operation. The extra area is used by most NAND-type flash management systems for storing whatever control information they need to keep and then retrieve, either during regular operation or at power-up.

The information fields stored in the extra area can be classified into several categories. A good example for the use of such different categories can be seen in U.S. Pat. No. 6,684,289 to Gonzalez et al. (see for example FIG. 10). Note that Gonzalez et al. actually discloses an atypical flash management system that separates the storage of user data from the storage of some of the control information associated with it, unlike what was explained above. Still, Gonzalez et al. is a good example for understanding the different categories of control fields.

The categories of control fields are:

(a) Fields associated with the specific contents of a page. By that we mean the field's value changes if the user data changes. The best (and usually the only) example for such field is an Error Correction Code (ECC) field, storing syndrome bits supporting the correction of errors in the data. We shall refer to such fields as "page data fields". The terms ECC and "page data fields" are used herein interchangeably.

(b) Fields associated with a page, but not with the specific data the page contains. One example for such a field is a flag indicating whether the data in the page was deleted by the user and is no longer valid. Another example is a field identifying a portion of the virtual address to which the page belongs. See for example U.S. Pat. No. 6,678,785 to Lasser, where the disclosed flash management system associates and stores with each page a field identifying the virtual page number within the virtual unit number to which the page corresponds. We shall refer to such fields as "page fields".

(c) Fields associated with a complete unit rather than with a single page. One example for such field is a flag indicating whether the unit is currently in use. Another example is a field providing the virtual unit number to which the unit corresponds. Such fields are herein referred to as "unit fields". While the above explanation assumes a one-to-one correspondence between flash pages and the minimal chunks of user data, this one-to-one correspondence is not mandatory for the methods of the present invention to apply. The above explanation is directly applicable to NAND flash devices having pages with a data area of 512 bytes each. Recently there are commercially available NAND flash devices having pages of 2,048 bytes each. Such devices provide 64 bytes of extra area per each page, keeping the same ratio of extra area to user data area. The above explanation is easily extended to this large-page device by using each physical page for storing four sectors of user data of 512 bytes each, each sector associated with its own control fields. Consequently, all methods of the present invention are fully applicable to large-page 2 Kbytes devices, and to devices of any other page size.

Returning now to the various types of control fields listed above, it is clear that the page data fields and page fields are required for each page. However, unit fields need not be stored with each page but only once per unit. Typically flash management systems store the unit fields in the first page of a unit, sometimes duplicating them in another page for improving reliability. Therefore the total amount of space required for control information per page is the sum of the amounts required for the page data fields, the page fields and the unit fields. This is so even though in most cases, in all pages except the first page of the unit, at least the part of the extra area corresponding to the unit fields is not used.

The amount of extra area available for control information is limited. As stated above, in currently available NAND flash devices the extra space is 16 bytes per each 512 bytes of user data. Flash management systems must work within this constraint. A trade-off of design goals is necessary so as not to exceed the available extra area. For example, a system design may allocate 6 bytes for ECC bits, leaving 10 bytes for supporting its management algorithms. Or a different system design may allocate 8 bytes for ECC bits, providing for a higher number of errors that can be corrected and consequently achieving a better system reliability. But in this case only 8 bytes are left for supporting the management algorithms, and this might result in more complex and possibly less efficient algorithms.

Even though it would thus seem advantageous to have flash devices with a larger extra area, flash manufacturers do not generally follow this path because a larger extra area means a more expensive device. Extra area bits consume silicon area exactly as user data bits do, and therefore the larger the extra area the larger the consumed silicon area Therefore minimizing extra area is highly desirable.

Consequently for any given flash management system, each one of the following goals would be desirable:

(a) Reduce the amount of extra area bytes that need to be provided per page. This goal applies to the design of new flash devices, where it is possible to deviate from the 16-bytes value currently used.

(b) For existing devices with an extra area of 16 bytes, provide as much space as possible for ECC so as to allow better reliability, without compromising management algorithms complexity and efficiency by supporting all control fields as before.

(c) For existing devices with a given extra area of 16 bytes, keep the ECC field the same size and provide room for more control fields for management algorithms so as to achieve less complex and more efficient flash management.

There is thus a need for, and it would be highly advantageous to have a method for achieving one or more of the above-mentioned goals, the method applicable to various classes of flash management systems.

One class of flash management systems to which the current invention is most applicable is the class of systems managing flash devices supporting multiple planes (some flash manufacturers refer to planes as "districts", and the two terms are interchangeable for the purpose of this invention). In such devices the units of the device are grouped into two or more disjoint "planes", where it is possible to have two or more pages programmed in parallel at the same time when each page belongs to a different plane. In contrast, in flash devices that do not support planes, only a single page can be programmed at a time. Similarly, in a device supporting planes, two or more units can be erased in parallel at the same time if each unit belongs to a different plane, while in a device not supporting planes only a single unit can be erased at a time.

The availability of planes support in a device provides for improved write performance, provided the flash management system is designed to take advantage of this feature. Improved write performance is achieved if two or more units are combined into a single "super-unit" so that the two or more units of the super-unit can be erased together, saving time. Erasing is typically the slowest flash operation (approximately 2 milliseconds in average in current NAND devices), and erasing two units in the time it would usually take to erase a single unit provides a performance boost to the system.

A similar approach was used in commercially available flash storage products for storage systems containing multiple flash devices. Subsequently, U.S. Pat. Nos. 6,034,897, 6,134,151 and 6,262,918 to Estakhri et al. were filed disclosing storage systems containing multiple flash devices. U.S.

Pat. Nos. 6,034,897, 6,134,151 and 6,262,918 are incorporated by reference for all purposes as if fully set forth herein. Estakhri applies to a system with multiple flash devices and combines units ("blocks" in his terminology) into "super blocks" where each super block contains a single unit from each device. Because Estakhri uses multiple independent devices, he can erase all units in a super-block in parallel, gaining on overall erase time. With a flash device that supports multiple planes, similar results to those of Estakhri are achieved for the storage system including just a single device. As multiple units can be erased in parallel if they are in separate planes, the methods of Estakhri are similarly applicable by treating each plane as a separate device.

A flash management system gains from having multiple planes or multiple devices by working with "super units" that are the size of the physical units multiplied by the number of planes or devices. For example, if the flash device has physical units of 16 Kbytes and supports two planes, the "super units" have 32 Kbytes. Or if the device has physical units of 128 Kbytes and supports four planes, the super units are of 512 Kbytes. The flash management system erases a super-unit efficiently, utilizing the available parallelism and achieving an erase time for a super unit that is approximately the same as the erase time of the much smaller physical unit. In the algorithms of the flash management system the super unit takes the place of the unit, allowing the flash management system to improve performance by utilizing the multiple planes (or multiple devices). Note that the above method only takes advantage of the device's capability to support multiple erase operations. There is also the additional option of taking advantage of the device's capability to support multiple write operations.

It should be noted there are flash management systems which also employ "super units" and do not necessarily perform parallel erase operations of multiple units. For example, the methods of the present invention are also applicable to the system disclosed in U.S. Pat. No. 6,591,330 to Lasser and will provide savings of extra area space Reference is now made to FIG. 1b illustrating schematically a super unit 15 with first unit 111a and one or more non-first units 111b being managed jointly. In prior art flash management systems using super units 15 more than one physical unit 111 forms a larger logical unit handled as a single allocation element. First unit 111a includes an extra area 20 and non-first unit 111b includes an extra area 31. Extra areas 20 and 31 are reserved for storing fields of the control information. In the prior art flash management systems extra area 31 is partially wasted. Extra area 31 is used for storing ECC bits that apply to user data residing in non-first units 111b, and extra area 31 is also used for storing page fields associated with the pages of non-first units 111b. But in prior art flash management systems area 31 is not used for storing unit fields, and space within area 31 corresponding to space within area 20 used for storing unit fields is left unused. The above applies to all types of flash management systems which use super units including:

(a) systems using devices supporting multiple planes (herein "Class A systems")
(b) systems using multiple devices operating in parallel (herein "Class B systems")
(c) systems grouping units into super units without getting the benefit of more efficient erasing (herein "Class C systems")

FIG. 2 (prior art) shows extra area 20 set up in a typical prior art flash management system. FIG. 2 applies to systems in which super units are not used, as well as to systems that use super units. For a super unit, FIG. 2 applies to the first unit within the super unit. In the case described in FIG. 2, extra area 20 is used for keeping fields of the three categories (ECC, unit fields and page fields) as mentioned above:
6 bytes for ECC (page data field)
8 bytes for unit fields
2 bytes for page fields.

FIG. 3 (prior art) shows extra area 31 in a non-first unit of a super unit in the same prior art flash management system with extra area 20 (FIG. 2) in a first unit with a system using super-units. While the ECC and page fields are the same as in FIG. 2, the unit fields are not used. Unit fields are not used because the same unit field values apply to all units, e.g. 111a and 111b within the same super unit, e.g 15, so it is enough to keep unit field values only once, typically in first unit 111a of super unit 15. For example, if one of the unit fields is generally reserved to hold a number of a virtual unit 121 corresponding to physical unit 111, then all units 111a and 111b of the same super unit 15 are known to correspond to the same virtual unit (or more precisely, to the same "super virtual unit").

SUMMARY OF THE INVENTION

The idea behind the current invention is to use extra area 31 of one or more units 111b within super unit 15 for storing the unit fields of information, and not use 15 extra area 20 of only one unit, i.e. first unit 111a as is the case in prior art systems which typically store such fields only in extra area 20 of first unit 111a of super unit 15.

According to some embodiments of the present invention, three cases are included of dividing unit fields between the units of a super-unit:

i. there is only one unit field and the unit field is divided between two units.

ii. there are two unit fields, one is put into a first unit and the other into a second unit.

iii. there are two unit fields, one unit field is put into a first unit and the other is divided between the first unit and a second unit.

The terminology as used herein of "units" and "pages" is not consistently used in the prior art. In U.S. Pat. No. 5,937,425 the term "block" is used instead of the term "page" as used herein. Other prior art systems use the term "sector" for "page" as used wherein and other prior art systems use the term "block" for "unit" as used herein. The term "unit" is defined herein as the smallest chunk of memory that can be erased. The term "page" is defined herein as the smallest chunk of memory that can be written. The terms "bits" and "binary bits" are used herein interchangeably.

Different prior art systems use different terms for "virtual" addressing—some use "virtual", some use "logical", others employ both terms in the same system, implementing a two-layer mapping between application-level addresses and device-level addresses, first mapping "virtual" to "logical" and then "logical" to "physical", or vice versa. All such mappings are within the applicable scope of the present invention According to the present invention there is provided a flash memory system including: one or more flash memory devices. The flash memory devices are each partitioned into multiple units, at least a first unit and a second unit. A mechanism which allocates the units in combination as a super-unit, reserves at least a portion of a first unit field required for managing the super-unit in the first unit and the mechanism reserves at least a portion of a second unit field required for managing the super-unit in the second unit. Preferably, the first unit field and the second unit field are different unit fields, or the first unit field and the second unit field are the same unit field. Preferably, the flash memory device each support at least two planes, and the first unit and the second unit each belong to a different plane. Alternatively, there are two flash memory devices, and the first unit and the second unit each belong to a different flash memory device.

According the the present invention there is provided a flash memory management method for managing at least one flash memory device partitioned into a plurality of units. The method includes allocating at least a first unit and a second unit of the units in combination as a super-unit; and reserving at least a portion of a first unit field required for managing the super-unit in the first unit; and reserving at least a portion of a second unit field required for managing the super-unit in the second unit.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1A:
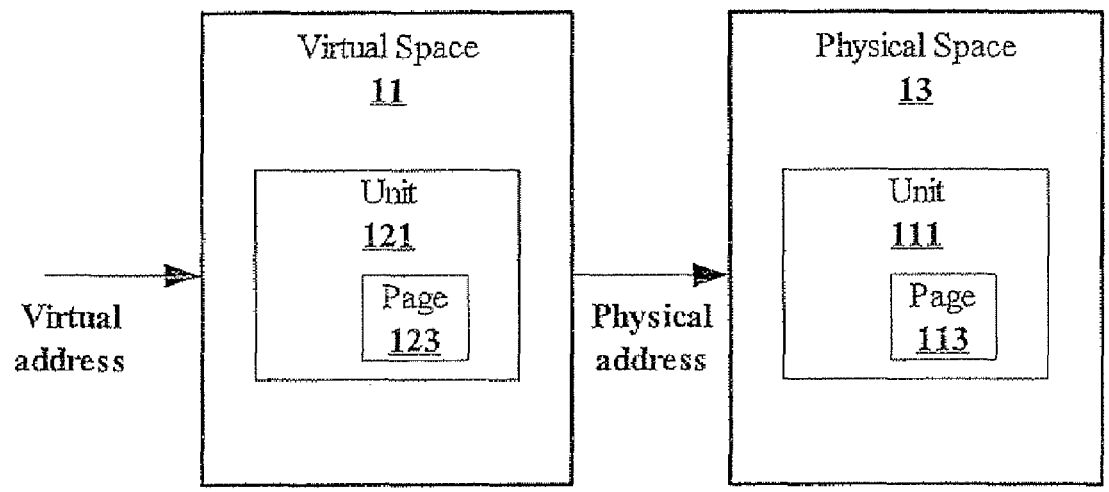
FIG. 1a (prior art) is a schematic representation of a conventional virtual to physical address translation in a flash file system.
Figure 1B:
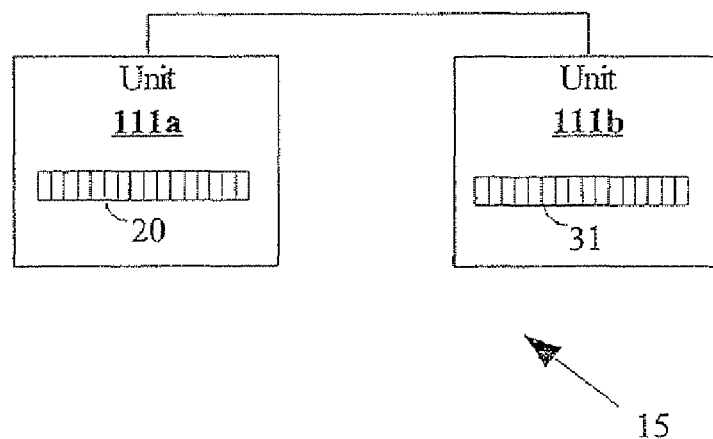
FIG. 1b (prior art) is a schematic representation of a super-unit.
Figure 2:
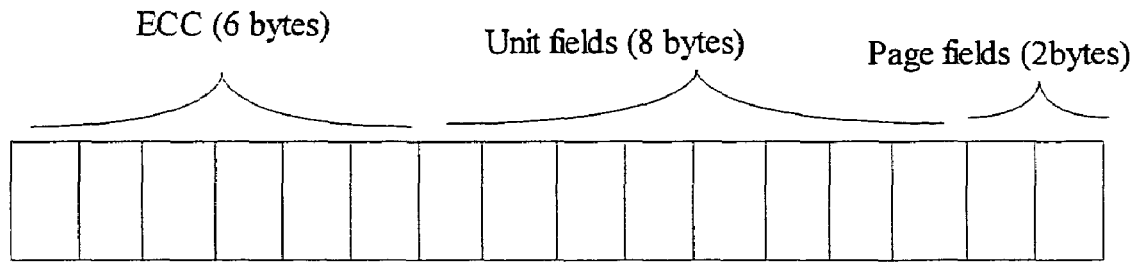
FIG. 2 (prior art) is a memory map of the extra area of a unit or first unit of a super-unit.
Figure 3:
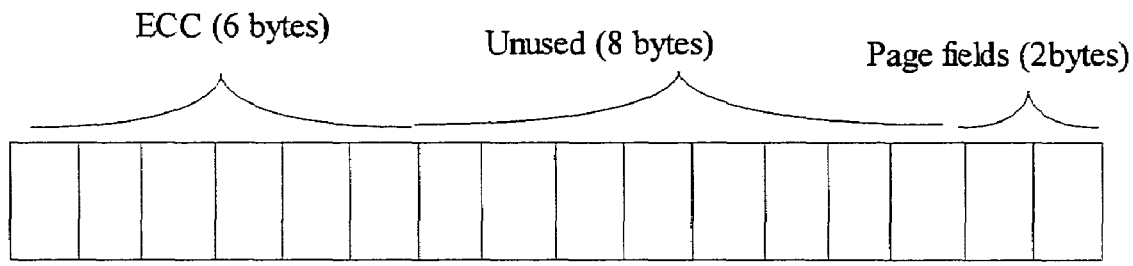
FIG. 3 (prior art) is a memory map of the extra area of a non-first unit of a super unit.

The present invention achieves the above mentioned goals for certain 25 important classes of flash management systems. The principles and operation of the system and method, according to the present invention, may be better understood with reference to the drawings and the accompanying description.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. It should be understood the invention is applicable not only to a specific flash management system but to any flash management system managing flash devices that provide an extra area in their pages and that conform to the requirements explained below.

Figure 4:
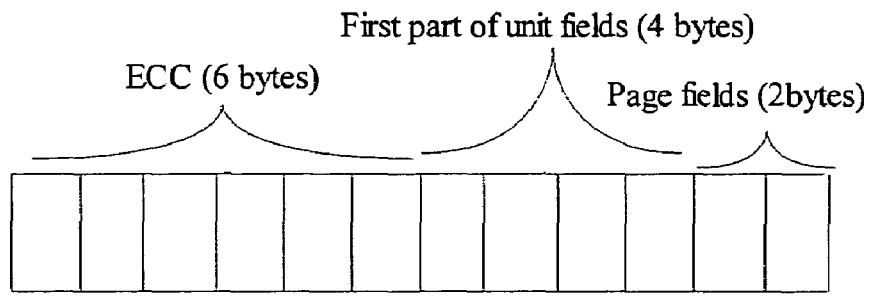
FIG. 4 is a memory map of an extra area of reduced size in a first unit, according to an embodiment of the present invention.
Figure 5:
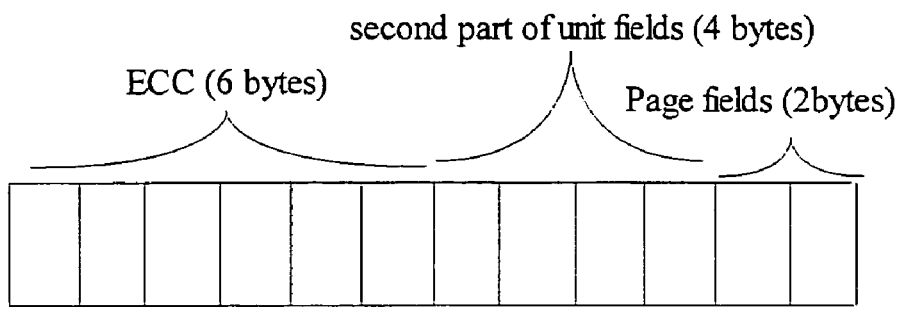
FIG. 5 is a memory map of an extra area of reduced size of a second unit, according to the same embodiment as FIG. 4.

FIG. 4 shows extra area 40 set up in first unit 111a of super unit 15 in a flash management system built according to a first embodiment of the current invention. FIG. 5 shows extra area 51 set up in non-first unit 111b of super unit 15 in the same flash management system. In this example we assume the system uses flash devices supporting two planes. In this case we took the approach of actually reducing the size of extra area 51 provided for each page, an approach which is possible when designing a new flash device. This in turn provides for a less costly device, a very advantageous result. The nice point in the set up of FIGS. 4 and 5 is that the flash management system can continue to use the same control fields, the same ECC, and the same algorithms as before. Each and every control field that was available before using the methods of the current invention, is still available after applying this improved set up. The eight bytes required by the system for its unit fields are still available—the only difference is they are now divided over two units of the super unit. The result in this example is a saving of 25% in the size of the extra area—just 12 bytes instead of 16.

Figure 6:
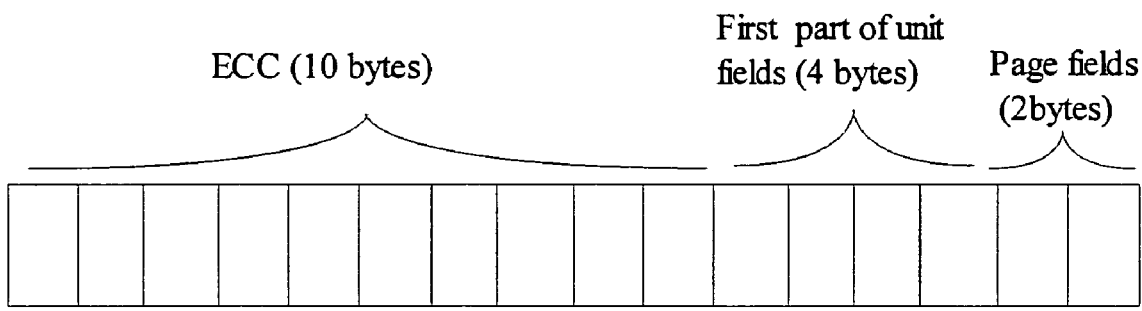
FIG. 6 is a memory map of an extra area of a first unit, according to another embodiment of the present invention.
Figure 7:
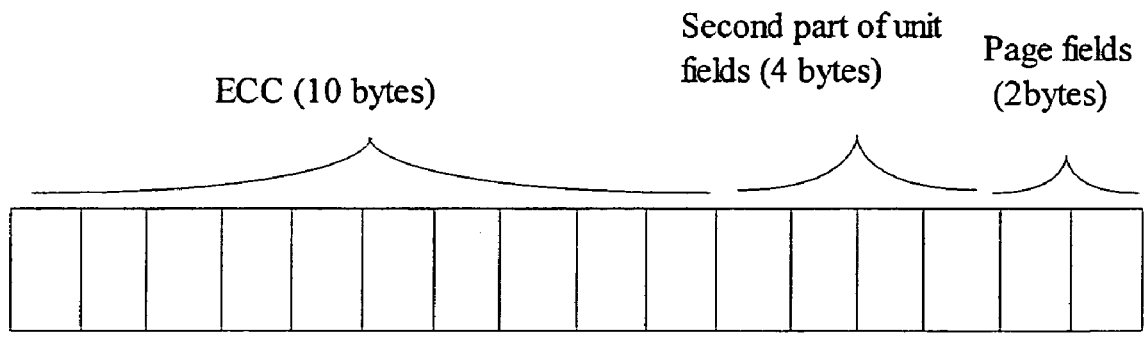
FIG. 7 is a memory map of an extra area of a non-first unit, according to the embodiment of FIG. 6.

Let us now look at another embodiment of the present invention, when we are not dealing with the design of a new flash device, but use an existing device having an extra area of 16 bytes. FIG. 6 shows extra area 60 set up in the first unit of a super unit in a flash management system built according to the second embodiment of the current invention. FIG. 7 shows extra area 71 set up in second unit 111b of a super unit in the same flash management system. In this example too, we assume the system uses flash devices supporting two planes. In this case the size of extra area 71 is not under our control, so our goal is to use the available space in a more efficient manner. Because we need to allocate only four bytes for unit fields per each unit (instead of eight bytes), we could increase the ECC area from six bytes to ten bytes. This in turn significantly increases the error detection and error correction capability of the system. The exact bit error numbers depend on the type of error codes used, but a typical example would be an increase in the error correction capability of the system from two bit errors per 512 bytes to five bit errors per 512 bytes. Thus the improvement of our invention, when applied to a system using an existing flash device supporting multiple planes, provides for a significant improvement in the system's reliability.

While the previous examples were of Class A systems, everything stated above is applicable just the same also to Class B and Class C systems. In all cases we save in unit fields' space by dividing the unit fields over more than one unit, for either actually reducing the extra area size or for improving other characteristics of the system.

The differences between the three classes show up when analyzing the effects of the methods of this invention on the performance of the system. Unlike in the prior art systems, in order to get the full unit fields information we need to read from two units 111 rather than from one unit 111. Typically, even flash devices that support multiple planes do not support parallel reading from more than one plane. Therefore in this regard Class A systems are not better than Class C systems. The reading of the control information will take more time than in prior art systems. In Class B systems, parallel reading can take place, because we have separate devices we can operate almost independently of each other, and therefore this disadvantage of slower reading does not apply. However, all this discussion about reading speed in not important—typically the unit control fields are read at start-up (or file system mounting time) and then cached in RAM. So there might be a minor slow-down in the system's start-up time, but no read performance penalty will be noticed during normal operation.

Now let us look at writing. The exact effect depends on the details of the flash management system algorithms. We shall need to write into two units instead of one when allocating a super unit for writing. Some systems may be able to avoid the time loss in having to write into two units by employing the available parallelism in writing, which is possible in classes A and B (but not C). But even if we take the worst case assumption that we always pay in time by spending one more page write operation, the time lost is negligible. This lost time will be paid just once per super unit, and as a super unit typically contains many pages, performance degradation will not be noticeable in practice.

To complete the performance discussion, we should also consider the relatively slow operation of erasing (which occurs from time to time as a by-product of writing). One can easily realize that applying the methods of the present invention does not effect the time spent on erasing. If the system can erase units of a super unit in parallel (as in classes A and B), it will still do so after applying the current invention. And if it cannot erase units of a super unit in parallel (as in class C), it will again remain the same after applying the current invention. Therefore there is no negative effect in this respect to applying the current invention.

Therefore, the foregoing is considered as illustrative only of the principles of the invention. Further, since numerous modifications and changes will readily occur to those skilled in the art, it is not desired to limit the invention to the exact design and operation shown and described, and accordingly, all suitable modifications and equivalents may be resorted to, falling within the scope of the invention.

While the invention has been described with respect to a limited number of embodiments, it will be appreciated that many variations, modifications and other applications of the invention may be made.

What is claimed is:

1. A flash memory system comprising:
   (a) at least one flash memory device partitioned into a plurality of units; and
   (b) a mechanism which allocates at least a first unit and a second unit of said units in combination as a super-unit, wherein a first unit field and a second unit field are required for managing said super-unit, wherein said mechanism reserves at least a portion of said first unit field in said first unit and said mechanism reserves at least a portion of said second unit field in said second unit.

2. The flash memory system of claim 1 wherein said first unit field and said second unit field are different unit fields.

3. The flash memory system of claim 1 wherein said first unit field and said second unit field are the same unit field.

4. The system of claim 1, wherein said at least one flash memory device supports at least two planes, wherein said first unit and said second unit each belongs to a different plane.

5. The system of claim 1, wherein said at least one flash memory device includes at least two said flash memory devices, wherein said first unit and said second unit each belongs to a different said flash memory device.

6. A flash memory management method for managing at least one flash memory device partitioned into a plurality of units, the method comprising:
   (a) allocating at least a first unit and a second unit of said units in combination as a super-unit; wherein a first unit field and a second unit field are required for managing said super-unit
   (b) reserving at least a portion of said first unit field in said first unit; and
   (c) reserving at least a portion of said second unit field in said second unit.

7. The method of claim 6, wherein said first unit field and said second unit field are different unit fields.

8. The method of claim 6, wherein said first unit field and said second unit field are the same unit field.

9. The method of claim 6, wherein said at least one flash memory device supports at least two planes, wherein said first unit and said second unit each belongs to a different plane.

10. The method of claim 6, wherein said at least one flash memory device includes at least two said flash memory devices, wherein said first unit and said second unit each belongs to a different said flash memory device.

* * * * *